United States Patent [19]
Itou et al.

[11] Patent Number: 5,811,778
[45] Date of Patent: Sep. 22, 1998

[54] OPTICAL INFORMATION READING APPARATUS HAVING DEFOCUS FUNCTION FOR ELIMINATING DATA ABERRATIONS

[75] Inventors: Kunihiko Itou, Anjo; Naoki Ukai, Okazaki, both of Japan

[73] Assignee: Nippondenso Co., Ltd., Kariya, Japan

[21] Appl. No.: 686,445

[22] Filed: Jul. 25, 1996

[30] Foreign Application Priority Data

Jul. 26, 1995 [JP] Japan .................................... 7-190505
Jul. 9, 1996 [JP] Japan .................................... 8-179228

[51] Int. Cl.⁶ ....................................................... G06K 7/10
[52] U.S. Cl. ......................... 235/462; 235/454; 235/472; 235/470; 359/739
[58] Field of Search .................................... 235/462, 463, 235/454, 472, 470; 359/738, 739

[56] References Cited

U.S. PATENT DOCUMENTS

| | | | |
|---|---|---|---|
| 4,408,120 | 10/1983 | Hara et al. | 235/462 |
| 4,538,060 | 8/1985 | Sakai et al. | 235/472 |
| 4,818,847 | 4/1989 | Hara et al. | 235/472 X |
| 4,874,933 | 10/1989 | Sanner | 235/470 |
| 5,151,580 | 9/1992 | Metlitsky et al. | 235/462 |
| 5,418,356 | 5/1995 | Takano | 235/462 |
| 5,449,892 | 9/1995 | Yamada | 235/462 |
| 5,504,317 | 4/1996 | Takakashi | 235/462 |
| 5,552,592 | 9/1996 | Dvorkis et al. | 235/462 |
| 5,648,877 | 7/1997 | Schnitzlein | 359/739 |

FOREIGN PATENT DOCUMENTS

| | | |
|---|---|---|
| 59-035274 | 2/1984 | Japan. |
| 60-235277 | 11/1985 | Japan. |
| 61-289471 | 12/1986 | Japan. |

OTHER PUBLICATIONS

Concise English Explanation of Japanese Prior Art Document No. SHO-235277, Nov. 21, 1985.

*Primary Examiner*—Donald T. Hajec
*Assistant Examiner*—Michael G. Lee
*Attorney, Agent, or Firm*—Cushman Darby & Cushman IP Group of Pillsbury Madison & Sutro LLP

[57] ABSTRACT

Distance L between best focus surface BF to reading opening 22 is in a range satisfying the condition: 2 mm $\leq |L| \leq 2a\cdot\omega/D$, where "D" represents the size of a short side of an elongated hole of a diaphragm 34a, "a" represents a distance from an objective-side principal point of an imaging lens 34 to the best focus surface BF, "ω" represents a minimum width of a module of bar code 8, "L" represents a distance measured from the best focus surface BF toward imaging lens 34, and |L| represents an absolute value of distance L. With this arrangement, adverse effect of stains, wounds and scratches of bar code 8 can be averaged or decentralized along the longitudinal direction of the bar of bar code 8 without deteriorating a reading accuracy in the lateral direction.

19 Claims, 6 Drawing Sheets

OPTICAL INFORMATION READING APPARATUS HAVING DEFOCUS FUNCTION FOR ELIMINATING DATA ABERRATIONS

BACKGROUND OF THE INVENTION

1. Field of the Invention

This invention relates to an optical information reading apparatus and an optical information reading method for performing an optical reading operation through an image of a bar code for obtaining information contained in the bar code.

2. Related Art

According to a conventional optical information reading apparatus, to obtain the information from a given bar code, the image of the bar code printed on a recording sheet is image-formed onto an optical sensor, such as CCD or the like, as disclosed in Unexamined Japanese Patent Application No. SHO 59-35274 or Unexamined Japanese Patent Application No. SHO 60-235277.

However, as shown in FIG. 8A, in the event that the bar code contains stains S, wound W and scratches (hereinafter referred to as "stain or the like"), an optical sensor, if it has a narrow visual field V compared with the stain or the like, will fail to accurately read the information of the bar code because the signal amplitude representing brightness and darkness is possibly attenuated due to the presence of such stain or the like as shown in FIG. 8B.

Furthermore, most conventional optical sensors comprise a plurality of light receiving elements linearly arrayed. And, an aspect ratio of each light receiving element is, for example, 200/14 (>14) which is so large that no reading error is caused due to the presence of a small stain or the like. The aspect ratio represents a ratio of a longitudinal size of a concerned element to a lateral size of the same.

On the other hand, to the end of cost reduction, there is a strong need for using a low aspect ratio optical sensor, such as an image pickup element adopted in facsimile machines. However, as described above, such a low aspect ratio optical sensor is sensitive to a stain or the like since it has a narrow visual field.

SUMMARY OF THE INVENTION

Accordingly, in view of the above-described problems encountered in the related art, a principal object of the present invention is to provide a novel and excellent method and apparatus capable of eliminating the adverse effect of stain or the like and accordingly capable of suppressing errors in the reading operation.

In order to accomplish this and other related objects, an aspect of the present invention provides an apparatus and a method for performing an optical reading operation for obtaining information from a given bar code, wherein an image of the bar code is defocused in a longitudinal direction of a bar consisting of the bar code, so that a defocusing degree of the image in the longitudinal direction becomes larger than a defocusing degree of the image in a lateral direction of the bar.

The contrast (brightness/darkness) of image of the bar code is essentially important and needs to be sharp enough in an array direction of bars constituting the bar code, i.e., in the lateral direction of each bar. In other words, unobviousness of the bar code image in its longitudinal direction will not cause serious errors in the reading operation of the information from the bar code. Hence, the present invention positively utilizes this fact that a relatively large defocusing condition can be allowed in the longitudinal direction of each bar of the bar code compared with the lateral direction thereof.

Meanwhile, defocusing has a function of averaging or moderating the contrast between brightness and darkness. Accordingly, even if the bar code is spoiled by a significant size of stain or the like which possibly causes a reading error in the best focus condition, such a stain or the like can be averaged or moderated or decentralized by defocusing the image of the bar code. Hence, the defocusing is an effective technique to eliminate the noise component such as stain or the like.

However, simply defocusing the image of the bar code is not recommendable because the bar code is entirely defocused so much that the reading operation of the information from the bar code will be failed.

In view of the foregoing, the present invention enlarges the defocusing degree of the bar code image in its longitudinal direction compared with the defocusing degree of the bar code image in its lateral direction. Hence, the adverse effect of stain or the like can be moderated and decentralized along the longitudinal direction of the bars of the bar code. Meanwhile, the reading operation of the bar code information can be surely performed by the accurate and sharp contrast of the image obtained in the lateral direction of each bar of the bar code.

According to the features of the preferred embodiment of the present invention, a diaphragm extending in the longitudinal direction of the bar of the bar code is provided, and the bar code is positioned at a predetermined defocusing position in the reading operation, thereby enlarging the defocusing degree of the bar code image in the longitudinal direction compared with the defocusing degree of the bar code image in the lateral direction.

More specifically, the optical information reading apparatus in accordance with present invention further comprises a casing; a read opening provided in the casing at a position confronting with the bar code for introducing a reading light reflected from the bar code; an imaging lens for receiving the reading light entered through the read opening and forming the image of the bar code at a predetermined read position; an optical sensor having a plurality of light receiving elements disposed in line at the predetermined read position, each light receiving element receiving light of the image of the bar code and generating an electric signal representing an intensity of the received light; and a diaphragm provided in the vicinity of the imaging lens and having a hole elongated in the longitudinal direction of the bar of the bar code.

Still further, the read opening is provided at the defocusing position so that the bar code can be read at the defocusing position by simply placing the apparatus on the bar code.

Regarding the relationship between the optical information reading apparatus and the bar code, it is of course possible to support the optical information reading apparatus by an appropriate support device at a position spaced from the bar code. In such a case, the bar code needs to be placed at a defocusing position no matter where the read opening is positioned.

If the read opening is offset toward the imaging lens with respect to the best focus surface, it will be possible to secure a relatively large defocusing space in front of the read opening, giving a large degree of freedom in determining the defocusing position.

As described previously, the conventional optical sensor comprising a plurality of light receiving elements arrayed in a line along the array direction of the bar code was weak against stain or the like when used according to the conventional reading method. Especially, when the light receiving element has an aspect ratio of not larger than 14, this tendency is remarkable. However, by employing the present invention, the reading error derived from the stain or the like can be eliminated effectively.

In this respect, the optical sensors (image pickup element, etc.) having an aspect ratio of approximately 1.0 are mass producible and cheap. The present invention makes it possible to use this kind of optical sensor in the bar code reader.

According to the present invention, the preferable range of the defocusing position is defined by the following numerical expression.

More specifically, the defocusing position is defined by a defocusing distance L satisfying the following condition:

$$2\ mm \leq |L| \leq 2a \cdot \omega/D$$

where "D" represents the size of a short side of the elongated hole of the diaphragm, "a" represents a distance from an objective-side principal point of the imaging lens to the best focus surface, "ω" represents a minimum width of a module of the bar code, "L" represents a distance measured from the best focus surface toward the imaging lens, and |L| represents an absolute value of distance L.

In order to enhance the effect of the present invention, it is preferable that the range of the defocusing distance L further satisfies the following condition:

$$3\ mm \leq |L| \leq 2a \cdot \omega/D$$

Still further, it is further preferable that the range of the defocusing distance L further satisfies the following condition:

$$5\ mm \leq |L| \leq 2a \cdot \omega/D$$

and further $$10\ mm \leq |L| \leq 2a \cdot \omega/D$$

If practical data are referred to, it is preferred that the range of the defocusing distance L further satisfies the following condition:

$$10\ mm \leq |L| \leq 16\ mm$$

Yet further, to obtain an optimal effect, it is more preferable that the defocusing distance L is substantially equal to $a \cdot \omega/D$. The defocusing position corresponding to $|L| \approx a \cdot \omega/D$ is a maximum defocusing position where no adverse effect is given to the reading operation of the image by optical sensor 36. More specifically, $|L| \approx a \cdot \omega/D$ represents an optimum defocusing position where a sufficiently large defocusing condition is realized in the longitudinal direction of the bar without causing any adverse effect to the amplitude of the bright/dark pattern signal, thereby surely eliminating the influence by stains or the like.

In this case, L>0 (i.e. $L \approx a \cdot \omega/D$) is further preferable by the reason that in the reading operation the bar code is positioned at the same side as the imaging lens with respect to the best focus surface. As described above, a wider defocusing space can be secured in front of the read opening.

In designing the optical information reading apparatus, there will be a necessity of further considering the limit of resolution by the diffraction with respect to the minimum width ω of the module of bar code (i.e. the minimum width among the widths of black and white bars consisting of the bar code) or a wavelength of the reading light.

In such a case, it is preferable that the bar code is disposed at a defocusing position satisfying not only a condition that the defocusing amount in the lateral direction of the bar is in a range capable of reading the information of the bar code but also a condition that the resolution in the lateral direction of the bar is in a range capable of reading the information of the bar code.

More specifically, when the reading light has a wavelength of λ, it is preferable that the defocusing distance L further satisfies the following condition:

$$a - (4D \cdot \omega)/(3\lambda) \leq L$$

It is needless to say that L>0 is preferable in this case, by the same reason described above.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENT

Figure 1:
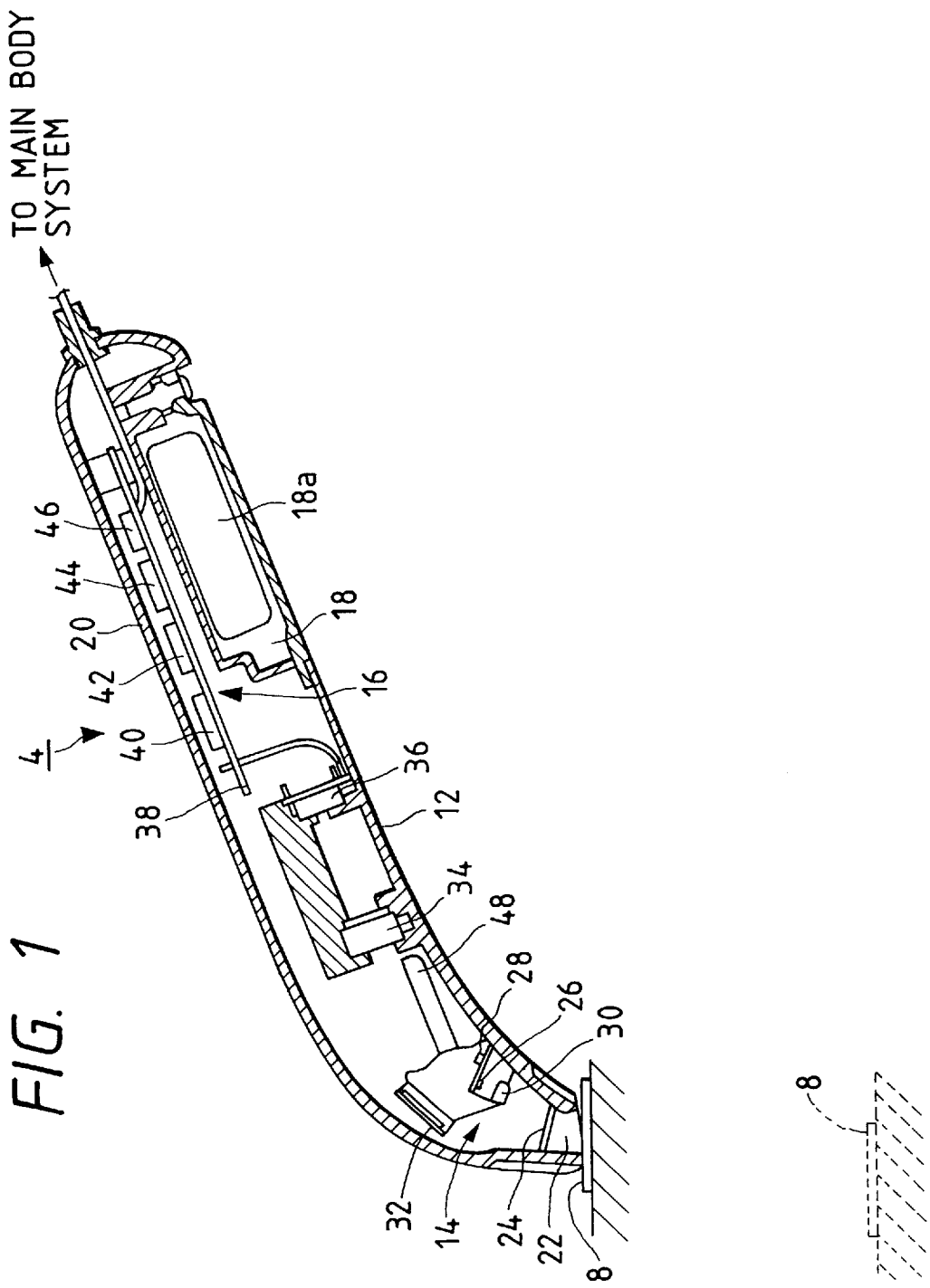
FIG. 1 is a schematic cross-sectional view showing a bar code reader in accordance with a preferred embodiment of the present invention.

A preferred embodiment of the present invention will be explained in greater detail hereinafter, with reference to the accompanying drawings. Identical parts are denoted by the same reference numerals throughout views.

Figure 2:
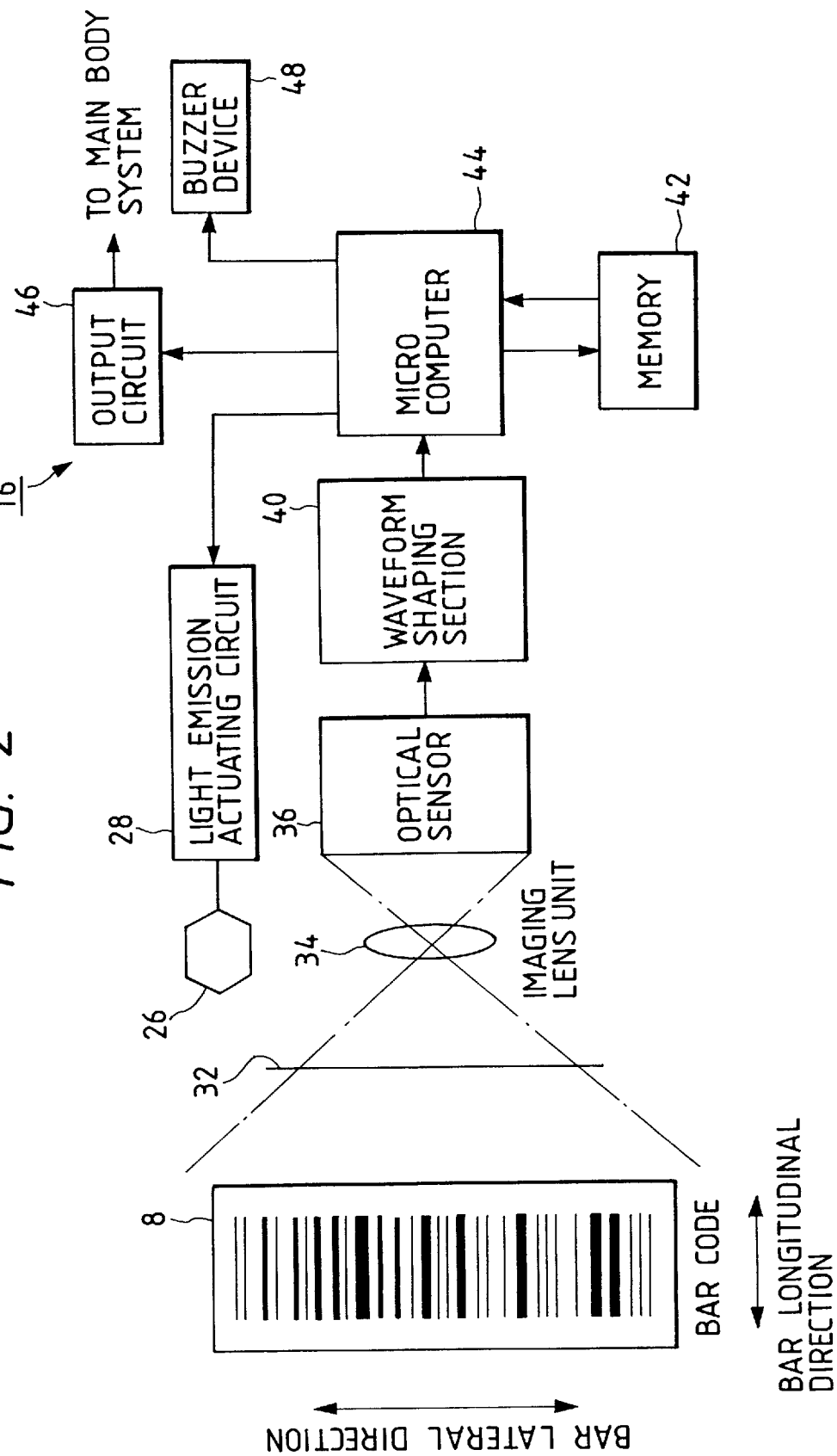
FIG. 2 is a circuit block diagram showing the detailed arrangement of a control section of the bar code reader in accordance with the embodiment of the present invention.

FIG. 1 is a schematic cross-sectional view showing a bar code reader 4 embodying the present invention, and FIG. 2 is a circuit block diagram showing the detailed arrangement of a control section of the bar code reader 4.

Bar code reader 4 comprises a main body casing 12, a read station 14, a data processing & output section 16, and a power source unit 18.

Read station 14 is disposed at the front end of the inside space of main body casing 12. A grip portion 20, allowing an operator to hold the main body casing 12 by his/her hand, is formed at the rear end of main body casing 12. A read opening 22 is provided at the lowermost end of the front end of main body casing 12. A dustproof plate 24 is disposed inside this read opening 22 to hermetically close the read opening 22. With this arrangement, it becomes possible to prevent any dust from entering into the inside space of main body casing 12 through this read opening 22. Dustproof plate 24 is made of a light-permeable material which is capable of passing the red light serving as a reading light later-described.

Read station 14 comprises a red light emitting diode 26 for emitting an illumination light, a light emission actuating circuit 28, a converging lens 30, a reflection mirror 32, an imaging lens unit 34, and an optical sensor 36. When the illumination red light is emitted from the red light emitting diode 26 in response to the actuation of light emission actuating circuit 28, this red light passes through dustproof plate 24 and irradiates a bar code 8 positioned beneath the read opening 22 of main body casing 12. Thus, bar code 8 receives the red light under the condition where bar code 8 is substantially brought into contact with the read opening 22. However, it is needless to say that bar code 8 can be read by the bar code reader 4 held by an operator or a supporting device (not shown) which is spaced from the bar code 8 as indicated by a dotted line in FIG. 1.

Figure 3A:
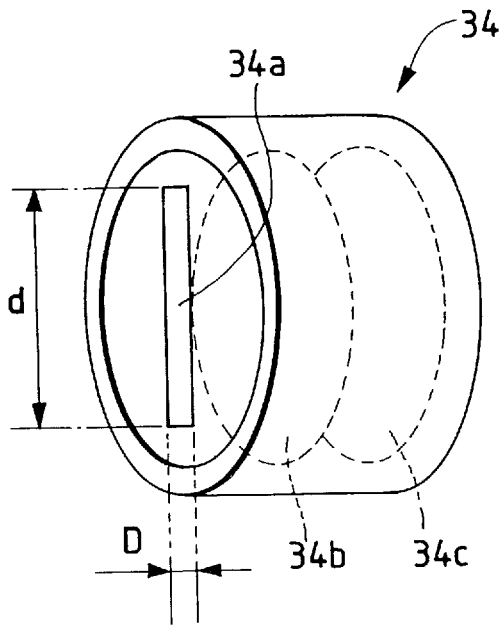
FIG. 3A is a perspective view showing an arrangement of an imaging lens unit of the bar code reader in accordance with the embodiment of the present invention.
Figure 3B:
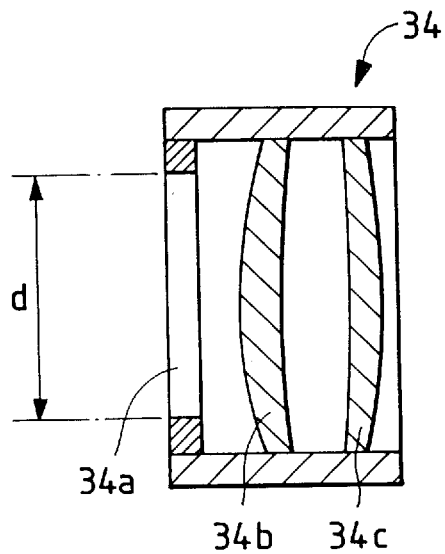
FIG. 3B is a cross-sectional view showing the imaging lens shown in FIG. 3A.

The red light, reflected from bar code 8, again passes through dustproof plate 24 and enters into the inside space of main body casing 12. Then, the red light is reflected by reflection mirror 32 and enters into imaging lens unit 34. As enlargedly shown in FIGS. 3A and 3B, imaging lens unit 34 of this embodiment comprises a diaphragm (or an orifice) 34a which is a rectangular hole longitudinally elongated. Through this longitudinally elongated diaphragm 34a, imaging lenses 34b and 34c, the image of bar code 8 is formed on the optical sensor 36 having a plurality of light receiving elements arrayed in a line under the condition where the array direction of bar is identical with the array direction of the light receiving elements of optical sensor 36. Optical sensor 36 reads the bar code 8 by performing photoelectric conversion, and sends out an electric signal representing the image pattern read to the data processing & output section 16.

The diaphragm 34a, accommodated in the imaging lens unit 34, is disposed closer to read opening 22 than imaging lenses 34b and 34c. And, the longitudinal direction of diaphragm 34a is identical with the longitudinal direction of each bar of bar code 8, so that each bar can be read through this diaphragm 34a. The optical sensor 36 of this embodiment comprises an ordinary image-pickup element used in facsimile machines for reading letters, figures and others of a given original, wherein a plurality of light receiving elements are arrayed in line and each light receiving element has an aspect ratio of approximately 1.

Data processing & output section 16, accommodated in main body casing 12, comprises a waveform shaping section 40, a memory 42, a micro computer 44, and an output circuit 46 such as a register to be connected to a main body system. Through waveform shaping section 40, data processing & output section 16 receives the data of bar code 8 read by read section 14. Micro computer 44 processes the data of bar code 8 to decode them, thereby obtaining information involved in the bar code 8. The decoded information is temporarily memorized in memory 42. Next, output circuit 46 converts the information memorized in the memory 42 into a serial signal and sends out this serial signal to the main body system.

A buzzer device 48 is provided near the read section 14 so as not to interfere with the optical path. Buzzer device 48 is activated every time the micro computer 44 succeeds in decoding the bar code 8.

Power source unit 18 houses a battery 18a as an electric power source.

Micro computer 44 comprises CPU, ROM, RAM, I/O and others to execute the processing of the above-described data processing & output section 16.

Figure 4:
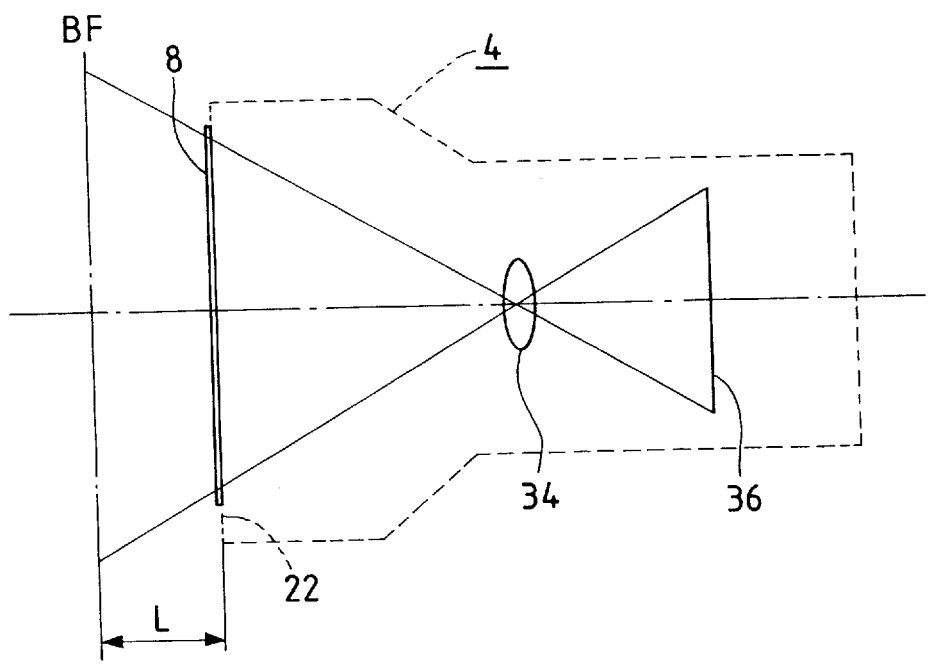
FIG. 4 is a view showing an optical disposition of the bar code reader in accordance with the embodiment of the present invention.

FIG. 4 shows an optical layout or disposition of the bar code reader 4. In the positional relationship between imaging lens unit 34 and optical sensor 36 of bar code reader 4, the best focus surface BF is set to be spaced outward from read opening 22 by a distance L. According to this embodiment, the reading operation of information is performed under the condition that bar code 8 is substantially brought into contact with read opening 22. In other words, the reading position of bar code 8 is offset from best focus surface BF toward imaging lens unit 34 by the distance L in a defocusing condition.

The range of this distance L is defined by the following numerical expression.

$$2 \text{ mm} \leq |L| \leq 2a \cdot \omega/D \tag{1}$$

where |L| represents an absolute value of distance L, "D" represents the length of a short side of an elongated hole of the diaphragm 34a incorporated in imaging lens unit 34, "a" represents a distance from the objective-side principal point of imaging lens unit 34 to the best focus surface BF, and "ω" represents a minimum width of the module of bar code 8, i.e. a minimum width among the widths of black and white bars in the bar code 8.

The above-described numerical expression (1) can be rewritten into the following two numerical expressions.

$$2 \text{ mm} \leq L \leq 2a \cdot \omega/D \tag{1-1}$$

$$-2a \cdot \omega/D \leq L \leq -2 \text{ mm} \tag{1-2}$$

Figure 5A:
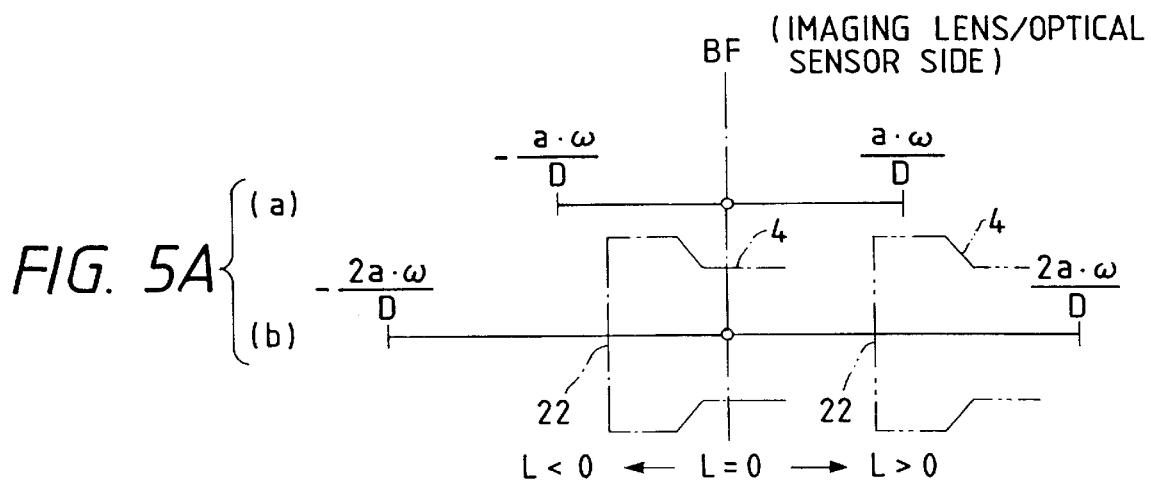
FIGS. 5A and 5B are views cooperatively illustrating a preferable defocusing range.

When the distance L shown by the numerical expression (1-1) is a positive value (L>0), the range of L corresponds to the condition where read opening 22 exists in the same side as optical sensor 36 with respect to the best focus surface BF as shown by an alternate long and two short dashes line shown in FIG. 5A. Namely, the best focus surface BF exists outside the main body casing 12. On the other hand, when the distance L shown by the numerical expression (1-2) is a negative value (L<0), the range of L corresponds to the condition where read opening 22 exists in the other side opposed to optical sensor 36 with respect to the best focus surface BF as shown by an alternate long and short dash line shown in FIG. 5A. Namely, the best focus surface BF exists inside the main body casing 12.

Positioning the read opening 22 in the range satisfying the above-described numerical expression 1 (or 1-1 and 1-2) makes it possible to cause, in the longitudinal direction of each bar of bar code 8, a relatively large defocusing condition preferable to spread or average the influence of stain or the like in the even the bar code 8 is spoiled by such stain or the like. Thus, the adverse influence of the local stain or the like can be moderated or decentralized along the longitudinal direction of the bar. On the other hand, the defocusing condition in the lateral direction, normal to the longitudinal direction, of each bar of bar code 8 can be suppressed within an adequate small value so as not to deteriorate the accuracy of the reading operation.

Figure 7A:
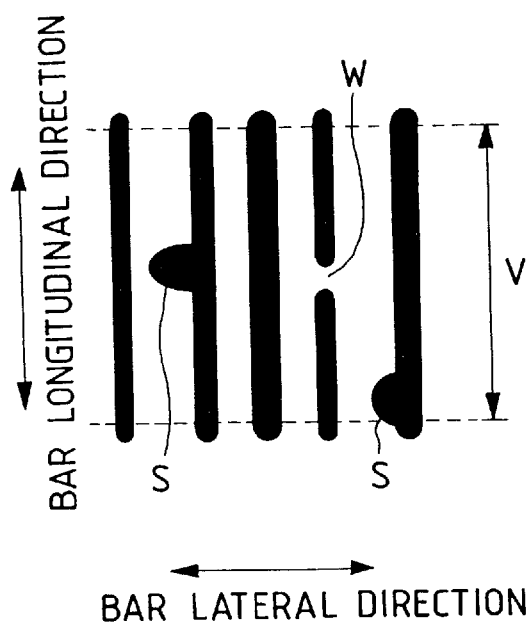
FIGS. 7A and 7B are views illustrating the influence of stain or the like in accordance with the embodiment of the present invention.
Figure 8A:
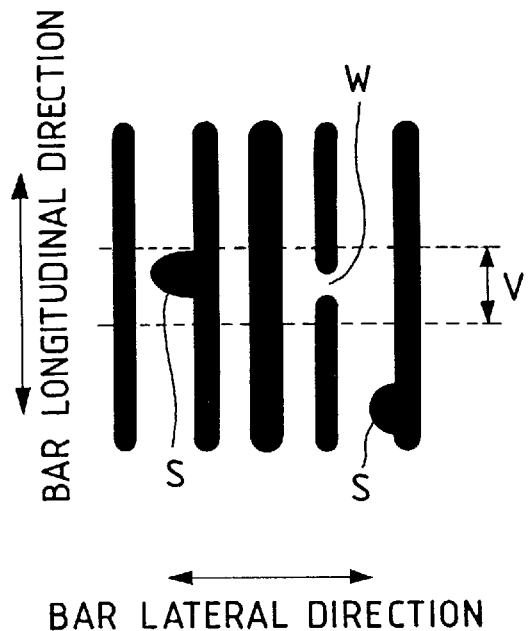
FIGS. 8A and 8B are views similar to FIGS. 7A and 7B but illustrating the influence of stain or the like in accordance with a conventional bar code reader.
Figure 8B:
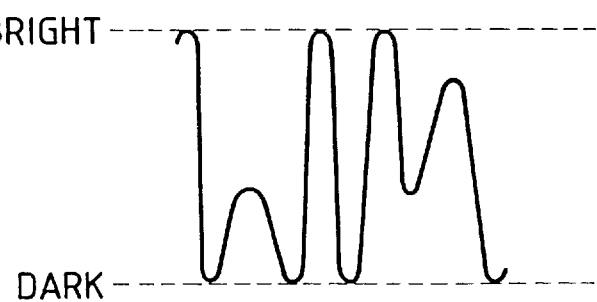

Accordingly, a readable visual field "V" of each light receiving element can be extended widely due to this realized defocusing condition compared with that of the conventional one as understood from the comparison between FIG. 7A and FIG. 8A. Thus, the abnormality of bright/dark contrast to be caused by stain S or the like can be spread or averaged in a moderate or decentralized manner in the longitudinal direction of the bar, even if the light receiving element of the image-pickup element has the light receiving element whose aspect ratio is approximately 1 like optical sensor 36 of the present invention.

With this moderation or decentralization of the bright/dark abnormality in the longitudinal direction, the pattern of bar code 8 other than the stain S or the like can contribute largely in discriminating the bright/dark pattern within the given visual field, thereby obtaining an accurate bright/dark information.

Figure 7B:
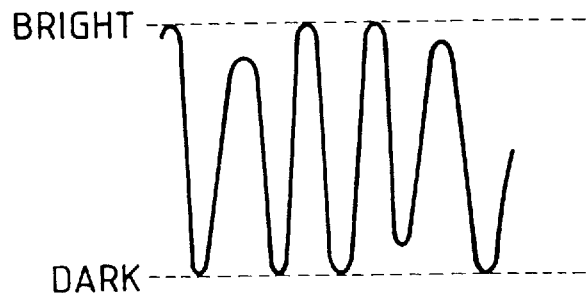

Furthermore, an important factor in performing the reading operation of bar code 8 is a characteristic change of bright/dark pattern in the lateral direction of the bar (i.e. a direction normal to the longitudinal direction of the bar). The defocusing condition in the lateral direction is maintained within an adequate small value so as not to cause any adverse effect in the reading operation; hence, the signal change causes a sharp change and has a large enough amplitude to discriminate brightness and darkness in the lateral direction of each bar as shown in FIG. 7B. Thus, it becomes possible to accurately read the information of bar code 8.

Although the distance L can be either of a positive value (L>0) and a negative value (L<0), it is desirable that read opening 22 is located at the same side as imaging lens unit 34 with respect to the best focus surface BF (i.e. the positive side).

In the case of the positive (L>0) side, almost all of the readable range existing in front of and behind the best focus surface BF is positioned outside the main body casing 12. Hence, it is possible to read the bar code 8 by placing it on the best focus surface BF as occasion demands, although such a reading disposition is not related to the present invention.

Furthermore, it is possible to perform the reading operation by placing the bar code 8 at a defocusing position opposed to the imaging lens unit 34 with respect to the reference position of best focus surface BF. In this manner, the degree of freedom in the reading operation is widened. It will be possible to dispose the bar code 8 at a position spaced far from the reading opening 22 if the bar code reader 4 is held by the hand of an operator. Furthermore, if the bar code 8 is always disposed at the same position in the reading operation, it will be desirable to fix the bar code reader 4 stationarily by a supplemental support device.

Accordingly, the range defined by the above-described numerical expression (1-1) is preferable to the range defined by the above-described numerical expression (1-2).

The following numerical expressions show further preferable ranges.

$$3 \text{ mm} \leq |L| \leq 2a \cdot \omega/D \tag{2}$$

$$5 \text{ mm} \leq |L| \leq 2a \cdot \omega/D \tag{3}$$

$$10 \text{ mm} \leq |L| \leq 2a \cdot \omega/D \tag{4}$$

$$10 \text{ mm} \leq |L| \leq 16 \text{ mm} \tag{5}$$

The above-described numerical expressions (2) through (4) have an enhanced defocusing condition compared with the previously described numerical expression (1). And, the degree of defocusing condition in each numerical expression is gradually enhanced in the order of (2)→(3)→(4). The numerical expression (5) is obtained by entering practical data into numerical expression (4).

As described above, it is preferable in each numerical expression that the distance L is in the positive range (L>0).

Furthermore, among such a range of distance L, an optimally desirable condition is obtained when the absolute value of distance L is nearly equal to $a \cdot \omega/D$ (i.e. $|L| \approx a \cdot \omega/D$). The defocusing position corresponding to $|L| \approx a \cdot \omega/D$ is a maximum defocusing position where no adverse effect is given to the reading operation of the image by optical sensor 36. More specifically, $|L| \approx a \cdot \omega/D$ represents an optimum defocusing position where a sufficiently large defocusing condition is realized in the longitudinal direction of the bar without causing any adverse effect to the amplitude of the bright/dark pattern signal, thereby surely eliminating the influence of stain S or the like. In this case, L>0 (i.e. $L \approx a \cdot \omega/D$) is further preferable by the same reason described above.

The basis for the above-described numerical expressions (1) through (5) will be explained in greater detail hereinafter.

The present invention proposes to enlarge the visual field of light receiving element 36a of optical sensor 36 by positively making a certain degree of defocusing condition, thereby eliminating any adverse effect derived from stain or the like. However, there is of course a limit in the degree of defocusing. In this respect, the defocusing degree can be enlarged in the longitudinal direction of each bar of bar code 8 without giving any adverse effect to the reading operation. On the contrary, the defocusing degree of the lateral direction needs to be suppressed within an adequate smaller value since the reading operation of bar code 8 is sensitive in the lateral direction of the bar. Accordingly, the upper limit in the above-described numerical expressions (1) through (4) is chiefly determined based on the allowable defocusing degree in the lateral direction.

Hereinafter, the limitation with respect to the lateral direction of each bar of bar code 8 will be explained.

The defocusing amount "x" is expressed by the following equation.

$$x = \pm (D \cdot L / a) \tag{11}$$

According to the study of inventors of the present invention, it is found that no adverse effect is given to the amplitude measurement of brightness and darkness of optical sensor 36 when this defocusing amount "x" is smaller than the minimum width ω of the module of bar code 8. In short, the amplitude measurement of bar code 8 can be accurately performed as long as the defocusing amount "x" is in a range of |x|=0 to ω.

Accordingly, the following equation is obtained by modifying the equation (11) by replacing "x" by "ω".

$$L = \pm (a \cdot \omega / D) \tag{12}$$

In other words, no adverse effect is given to the reading accuracy when the defocusing length L is smaller than the value defined by the equation (12).

Furthermore, according to the study of the inventors, it is found that an acceptable reading accuracy is obtained even if the defocusing length L is extended up to twice (i.e. $2a \cdot \omega/D$), although the signal amplitude is reduced somewhat in the detection of brightness and darkness of bar code 8.

Accordingly, an accurate reading operation of bar code 8 can be assured when the defocusing length L is in a range defined by the following expression.

$$|L| \leq 2a \cdot \omega/D \quad (12\text{-}1)$$

Next, the limitation with respect to the longitudinal direction of each bar of bar code 8 will be explained.

When the distance L is zero (i.e. in the condition of best focus surface BF), the defocusing amount "x" is zero (x=0). Hence, the defocusing amount "x" of the longitudinal direction of each bar also becomes 0, and adverse effect of stain or the like will directly appear. Hence, L=0 is excluded. Furthermore, besides L=0, it is necessary to exclude a certain range of smaller distance L in order to eliminate the adverse effect of stain or the like of bar code 8 and assure an adequate defocusing condition.

From the above consideration, 2 mm of the numerical expression (1) is determined as the lower limit for the absolute value |L| of the distance L.

The defocusing condition in the longitudinal direction of each bar of bar code 8 is basically affected by the length "d" of the long side of rectangular diaphragm 34*a* accommodated in imaging lens unit 34. Accordingly, "D" of equation 11 is replaced by "d". Hence, the defocusing amount "x" of the longitudinal direction is enlarged compared with that of the lateral direction.

The fact that the defocusing amount of the longitudinal direction is fairly larger than that of the lateral direction means that the reading operation is robust against the stain S or the like. More specifically, even if bar code 8 is spoiled by such a stain S or the like, each bar is sufficiently long compared with this kind of stain S or the like. Hence, the brightness and darkness detected by optical sensor 36 can be mainly discriminated by the white and black pattern of genuine bars consisting of bar code 8 without being adversely affected by stain S or the like. In addition, as shown in FIG. 7B, the brightness and darkness can be measured with sufficient amplitudes. Thus, it becomes possible to obtain accurate information regardless of the existence of stain or the like in bar code 8.

Furthermore, in the case of L<0, the best focus surface BF is positioned inside the main body casing 12. Accordingly, as described previously, it will be preferable that the distance L satisfies the condition of expression (1-1) rather than expression (1).

Moreover, as explained with reference to the equation (11), the defocusing condition, if given in the range of L=0 to $\pm(a \cdot \omega/D)$ as shown in (a) of FIG. 5A, does not give any adverse affect to the signal amplitude in the brightness/darkness detection at all. In this range, it is preferable that the distance L is set to $L \approx \pm(a \cdot \omega/D)$, i.e. $|L| \approx a \cdot \omega/D$, because the defocusing condition is maximized in the longitudinal direction of each bar of bar code 8. It is needless to say that setting of $L \approx a \cdot \omega/D$ is further preferable since the best focus surface BF is positioned outside the main body casing 12.

Next, the practical range of distance L will be explained by using exemplarily data.

In the bar code reader 4 of the present embodiment, elongated rectangular diaphragm 34*a* has a long side "d" of 5 mm and a short side "D" of 1 mm. The distance "a", i.e. the distance between the objective-side principal point of imaging lens unit 34 to the best focus surface BF, is 80 mm. And, the minimum width "ω" of the module of bar code 8 is 0.1 mm.

By entering these data into the expression (1), the upper limit $2a \cdot \omega$ becomes 16 mm and, therefore, the expression (1) is rewritten into the following numerical expression.

$$2 \text{ mm} \leq |L| \leq 16 \text{ mm} \quad (13)$$

Similarly, expressions (1-1) and (1-2) can be rewritten into the following numerical expressions.

$$2 \text{ mm} \leq L \leq 16 \text{ mm} \quad (13\text{-}1)$$

$$-16 \text{ mm} \leq L \leq -2 \text{ mm} \quad (13\text{-}2)$$

Similarly, expressions (2) and (4) can be rewritten into the following numerical expressions.

$$3 \text{ mm} \leq |L| \leq 16 \text{ mm} \quad (14)$$

$$5 \text{ mm} \leq |L| \leq 16 \text{ mm} \quad (15)$$

$$10 \text{ mm} \leq |L| \leq 16 \text{ mm} \quad (16)$$

By setting the range of distance L in a manner described above, it becomes possible to moderate or decentralize the adverse effect of stain or the like of bar code 8 along the longitudinal direction of the bar, thereby obtaining accurate information.

Next, the consideration will be given to the degree of the defocusing amount required for effectively moderating or decentralizing the presence of stain or the like. According to the study of the inventors, it was found that the stain or the like can be neglected by defocusing its image by the magnitude of twice or more of the actual size of the stain or the like. Namely, optical sensor 36 cannot detect the stain or the like when its image is defocused by the magnitude of twice or more.

In this case, the direction along which the stain or the like is defocused is the longitudinal direction of the bar of bar code 8. Hence, the defocusing amount of this longitudinal direction can be obtained by utilizing the above-described numerical expression (12-1). The thing different, in the comparison between the longitudinal direction and the lateral direction, is that the length "d" of the long side of the elongated diaphragm 34*a* gives a large effect rather than the short side thereof, and that the size ω of the stain or the like gives a large effect instead of the minimum width ω of the module of bar code 8.

Accordingly, the stain or the like can be neglected by setting the defocusing amount larger than $2a \cdot \omega'/d$. That is, the defocusing distance L capable of neglecting the stain or the like can be defined by the following inequality.

$$2a \cdot \omega'/d < |L| \quad (17)$$

Regarding stains, wounds and scratches, many of them are produced in the printing process of bar code 8. Especially, when a thermosensitive paper is used in the printing operation, there is a tendency that many scratches are produced. The size of these kind of stains or the like is generally in a range of 0.06 mm to 0.09 mm. Even the maximum one will be less than 0.1 mm.

Accordingly, it becomes possible to effectively decentralize the adverse effect of the stain or the like by limiting the distance L in the following range obtained by entering ω'=0.1 mm in the above inequality (17).

$$0.2a/d < |L| \quad (18)$$

According to the practical data, the length "d" of the long side of elongated rectangular diaphragm 34*a* is 5 mm and the distance "a" between the objective-side principal point of imaging lens unit 34 to the best focus surface BF is 80 mm. By entering these values in the above inequality (18), the next inequality is derived.

$$3.2 \text{ mm} < |L| \quad (19)$$

Hence, setting the distance L in the range satisfying both of expressions (12-1) and (19) simultaneously makes it possible to adequately suppress the defocusing degree in the lateral direction of the bar and at the same time to moderate or decentralize the adverse effect of stain or the like in the longitudinal direction of the bar, thereby obtaining accurate information.

According to demonstrations, it is found that the reading operation of bar code 8 can be satisfactorily performed even if the distance L is in a more wide range defined by the following numerical expression.

$$2 \text{ mm} < |L| \tag{19-1}$$

Hence, setting the distance L in the range satisfying both of expressions (12-1) and (19-1) simultaneously makes it possible to adequately suppress the defocusing degree in the lateral direction of the bar and at the same time to moderate or decentralize the adverse effect of stain or the like in the longitudinal direction of the bar, thereby obtaining accurate information.

Combining the expression (12-1) with the expression (19-1) finally gives the above-introduced expression (1). Similarly, combining the expression (12-1) with the expression (19) gives the above-introduced expression (2). In the same manner, expressions (3) and (4) are derived to more restrictively remove the adverse effect of stain or the like.

Determining the range of defocusing distance L in the manner described above is desirable ordinarily. However, if it is necessary to enhance the performance of bar code reader 4, the defocusing distance L needs to be determined more strictly.

Figure 5B:
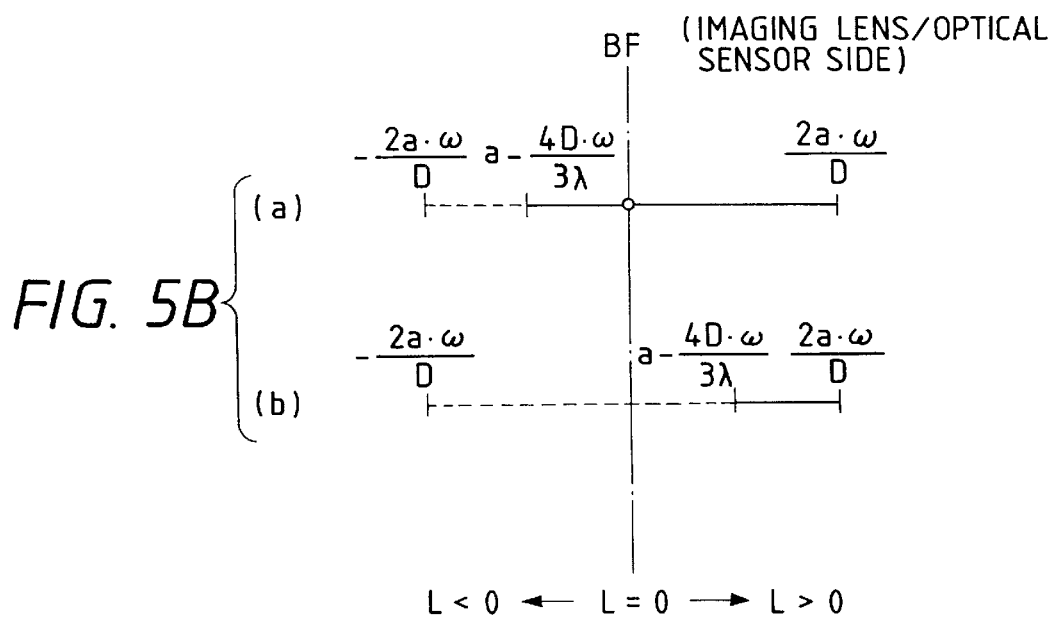
Figure 6:
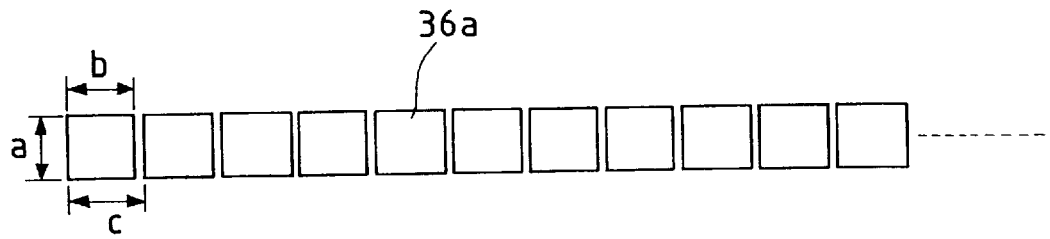
FIG. 6 is a view schematically illustrating an aspect ratio of a light receiving element in accordance with the embodiment of the present invention.

More specifically, there is a necessity of considering the limit of resolution by the diffraction with respect to the minimum width $\omega$ of the module of bar code 8 (i.e. the minimum width among the widths of black and white bars consisting of the bar code) or a wavelength $\lambda$ of the reading light irradiated from the red light emitting diode (or from an external irradiation light). For this reason, as shown in FIG. 5B, it is desirable to further limit the readable defocusing length L.

Resolution "y" can be defined by the following expression.

$$y = 1.22 \lambda \cdot (a-L)/D \tag{20}$$

Hence, only when the resolution is smaller than the minimum width $\omega$ of the module, optical sensor 36 can discriminate each bar of bar code 8. Accordingly, it is necessary to satisfy the following condition.

$$\omega \geq 1.22 \lambda \cdot (a-L)/D \tag{21}$$

Expressions (20) and (21) are well-known as defining the resolution discriminable by human eyes. When the image is formed on the light receiving element a of CCD element etc, it can be further enlarged by the use of an amplifier etc. Hence, it becomes possible to obtain a finer resolution.

According to the study of the inventors, which was conducted by varying the minimum width $\omega$ of the module and the length D of the short side of diaphragm 34a under the condition that a large quantity of light of uniform distribution and constant wavelength $\lambda$ is used for illumination and the distance (a−L) is constant, it is found that optical sensor 36 can discriminate each bar of bar code 8 in the range defined by the following expression.

$$\omega \geq (\tfrac{3}{4}) \lambda \cdot (a-L)/D \tag{22}$$

By modifying the expression (22), the following expression is obtained.

$$a - (4D \cdot \omega)/(3\lambda) \leq L \tag{6}$$

Accordingly, when the diffraction does not give any effect to the defocusing range defined by expressions (1) through (5), it becomes possible to perform the reading operation capable of eliminating the adverse effect of stain S or the like of bar code 8 by setting read opening 22 in the range shown by (b) of FIG. 5A.

However, when any adverse effect of resolution is given in this range, the region indicated by a dotted line becomes unreadable and therefore the readable region is substantially limited to the region indicated by a solid line, as shown in (a) or (b) of FIG. 5B. Hence, it becomes necessary to satisfy both the expressions (1) and (6), or either one of expressions (2) through (5) and the expression (6).

According to the above-described embodiment, each light receiving element 36a arrayed in line and consisting of optical sensor 36 has an aspect ratio (a/b or a/c) of approximately 1. However, the reading error can be effectively suppressed regardless of the value of the aspect ratio, as long as the one selected from the group of expressions (1) through (5) and the expression (6) are simultaneously satisfied.

However, when the aspect ratio is not larger than 14, the reading operation tends to be disturbed by stain or the like. Therefore, the above settings is especially effective when the aspect ratio are not larger than 14.

Although the above-described embodiment discloses imaging lens unit 34 incorporating enlarged diaphragm 34a, it is of course possible to provide the diaphragm 34a independently of imaging lens unit 34. Furthermore, the configuration of elongated diaphragm 34a can be any elongated shape such as rectangle, ellipse, or rhomboid.

As this invention may be embodied in several forms without departing from the spirit of essential characteristics thereof, the present embodiment described is therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. An optical information reading apparatus comprising:

means for reading information from a given bar code;

means for defocusing an image of the bar code in a longitudinal direction of a bar consisting of said bar code, so that a defocusing degree of said image in said longitudinal direction becomes larger than a defocusing degree of said image in a lateral direction of said bar;

a casing;

a read opening provided in said casing at a position confronting with said bar code for introducing a reading light reflected from said bar code;

an imaging lens for receiving said reading light entered through said read opening and forming the image of said bar code at a predetermined read position;

an optical sensor having a plurality of light receiving elements disposed in line at said predetermined read position, the light receiving element receiving a light of said image of said bar code and generating an electric signal representing an intensity of said received light; and a diaphragm provided in a vicinity of said imaging lens and having a hole elongated in said longitudinal direction of said bar of said bar code, wherein said read opening is provided at a defocusing position so that said bar code can be read at the defocusing position; and said focusing position is defined by a defocusing distance L satisfying the following condition:

$$2 \text{ mm} \leq |L| \leq 2a \cdot \omega/D$$

where "D" represents a size of a short side of said elongated hole of said diaphragm, "a" represents a distance from an objective-side principal point of said imaging lens to a best focus surface, "ω" represents a minimum width of a module of said bar code, "L" represents a distance measured from the best focus surface toward said imaging lens, and |L| represents an absolute value of distance L.

2. An optical information reading apparatus in accordance with claim 1, wherein said bar code is positioned at a predetermined defocusing position in a reading operation, thereby enlarging the defocusing degree of said image in said longitudinal direction compared with the defocusing degree of said image in the lateral direction.

3. The optical information reading apparatus in accordance with claim 1, wherein said each light receiving element has an aspect ratio of not larger than 14, where said aspect ratio represents a ratio of a longitudinal size to a lateral size.

4. The optical information reading apparatus in accordance with claim 1, wherein said each light receiving element has an aspect ratio of approximately 1.

5. The optical information reading apparatus in accordance with claim 1, wherein said defocusing distance L further satisfies the following condition:

$$3 \text{ mm} \leq |L| \leq 2a \cdot \omega/D.$$

6. The optical information reading apparatus in accordance with claim 1, wherein said defocusing distance L further satisfies the following condition:

$$5 \text{ mm} \leq |L| \leq 2a \cdot \omega/D.$$

7. The optical information reading apparatus in accordance with claim 1, wherein said defocusing distance L further satisfies the following condition:

$$10 \text{ mm} \leq |L| \leq 2a \cdot \omega/D.$$

8. The optical information reading apparatus in accordance with claim 7, wherein said defocusing distance L further satisfies the following condition:

$$10 \text{ mm} \leq |L| \leq 16 \text{ mm}.$$

9. The optical information reading apparatus in accordance with claim 1, wherein said defocusing distance L is substantially equal to $a \cdot \omega/D$.

10. The optical information reading apparatus in accordance with claim 1, wherein said defocusing distance L is a positive value.

11. The optical information reading apparatus in accordance with claim 1, wherein said defocusing distance L is further limited by resolution due to diffraction.

12. The optical information reading apparatus in accordance with claim 11, wherein said bar code is disposed at a defocusing position satisfying not only a condition that a defocusing amount in the lateral direction of said bar is in a range capable of reading the information of said bar code but also a condition that said resolution in the lateral direction of said bar is in a range capable of reading the information of said bar code.

13. The optical information reading apparatus in accordance with claim 11, wherein said reading light has a wavelength of λ, and said defocusing distance L further satisfies a condition relating to the resolution due to the diffraction which is defined by the following condition:

$$a-(4D \cdot \omega)/(3\lambda) \leq L.$$

14. An optical information reading apparatus comprising:

a casing;

a read opening, in the casing at a position opposing an information-bearing indicia, for introducing reading light reflected from the indicia;

an imaging lens for receiving reading light entering the read opening and forming an image of the indicia at a predetermined read position;

a diaphragm proximate to the imaging lens, the diaphragm having a hole elongated in the first direction;

means for receiving the image of the indicia formed by the imaging lens at a defocusing position and defocusing the image in a first direction to a first degree and in a second direction to a second degree smaller than the first degree to produce a defocused image;

means for deriving information from the information-bearing indicia based on the defocused image;

wherein the read opening is at the defocusing position; and the defocusing position is defined by a defocusing distance L satisfying the following condition:

$$2 \text{ mm} \leq |L| \leq 2a \cdot \omega/D$$

where "D" represents a size of a short side of the elongated hole of the diaphragm, "a" represents a distance from an objective-side principal point of the imaging lens to a best focus surface, "ω" represents a minimum width of a module of the indicia, "L" represents a distance measured from the best focus surface toward the imaging lens, and |L| represents an absolute value of distance L.

15. The optical information reading apparatus in accordance with claim 14, wherein the means for deriving information includes an optical sensor having multiple light receiving elements, wherein a ratio of a dimension of each light receiving element in the first direction to a dimension of each light receiving element in the second direction is not larger than 14:1.

16. The optical information reading apparatus in accordance with claim 15, wherein the ratio is approximately 1:1.

17. The optical information reading apparatus in accordance with claim 14, wherein the defocusing distance L is substantially equal to $a \cdot \omega/D$.

18. The optical information reading apparatus in accordance with claim 14, wherein the defocusing distance L is positive.

19. The optical information reading apparatus in accordance with claim 14, wherein the reading light has a wavelength of λ and the defocusing distance L further satisfies a condition relating to limited resolution due to diffraction defined by:

$$a-(4D \cdot \omega)(3\lambda) \leq L.$$

* * * * *